US012079991B2

(12) United States Patent
Galeotti et al.

(10) Patent No.: US 12,079,991 B2
(45) Date of Patent: Sep. 3, 2024

(54) DEEP-LEARNING MODELS FOR IMAGE PROCESSING

(71) Applicant: Carnegie Mellon University, Pittsburgh, PA (US)

(72) Inventors: John Galeotti, Pittsburgh, PA (US); Tejas Sudharshan Mathai, Seattle, WA (US)

(73) Assignee: Carnegie Mellon University, Pittsburgh, PA (US)

( * ) Notice: Subject to any disclaimer, the term of this patent is extended or adjusted under 35 U.S.C. 154(b) by 413 days.

(21) Appl. No.: 17/618,208

(22) PCT Filed: Jun. 12, 2020

(86) PCT No.: PCT/US2020/037427
§ 371 (c)(1),
(2) Date: Dec. 10, 2021

(87) PCT Pub. No.: WO2020/252256
PCT Pub. Date: Dec. 17, 2020

(65) Prior Publication Data
US 2022/0172360 A1   Jun. 2, 2022

Related U.S. Application Data

(60) Provisional application No. 62/860,392, filed on Jun. 12, 2019.

(51) Int. Cl.
*G06T 7/00* (2017.01)
*G06N 3/045* (2023.01)
(Continued)

(52) U.S. Cl.
CPC ........... *G06T 7/0012* (2013.01); *G06N 3/045* (2023.01); *G06N 3/082* (2013.01); *G06T 7/11* (2017.01);
(Continued)

(58) Field of Classification Search
CPC ............. G06T 7/0012; G06T 7/11; G06T 2207/10101; G06T 2207/20081;
(Continued)

(56) References Cited

U.S. PATENT DOCUMENTS 10,504,027 B1 *  12/2019  Kim ................. G06F 18/214
2016/0063359 A1   3/2016  Szegedy et al.
(Continued)

FOREIGN PATENT DOCUMENTS

CN      109754389 A      5/2019

OTHER PUBLICATIONS

Dos Santos et al., "CorneaNet fast segmentation of cornea OCT scans of healthy and keratoconic eyes using deep learning", Biomedical Optics Express 622, 2019, 20 pages, vol. 10, No. 2 (Year: 2019).*
(Continued)

Primary Examiner — Juan A Torres
(74) Attorney, Agent, or Firm — The Webb Law Firm (57) ABSTRACT

Provided is a system, method, and computer program product for creating a deep-learning model for processing image data. The method includes establishing dense connections between each layer of a plurality of layers of a convolutional neural network (CNN) and a plurality of preceding layers of the CNN, downsampling an input of each downsampling layer of a plurality of downsampling layers in a first branch of the CNN, and upsampling an input of each upsampling layer of a plurality of upsampling layers in a second branch of the CNN by convolving the input.

20 Claims, 7 Drawing Sheets

(51) Int. Cl.
*G06N 3/082* (2023.01)
*G06T 7/11* (2017.01)

(52) U.S. Cl.
CPC ............ *G06T 2207/10101* (2013.01); *G06T 2207/20081* (2013.01); *G06T 2207/20084* (2013.01); *G06T 2207/30041* (2013.01)

(58) Field of Classification Search
CPC ........... G06T 2207/20084; G06T 2207/30041; G06N 3/045; G06N 3/082
USPC ....................................................... 382/128
See application file for complete search history.

(56) References Cited

U.S. PATENT DOCUMENTS

| | | |
|---|---|---|
| 2016/0259994 A1 | 9/2016 | Ravindran et al. |
| 2017/0236057 A1 | 8/2017 | Lane et al. |
| 2017/0262735 A1 | 9/2017 | Ros Sanchez et al. |
| 2017/0287109 A1 | 10/2017 | Tasfi |
| 2018/0374209 A1* | 12/2018 | Patil ...................... G06N 3/084 |
| 2019/0139216 A1 | 5/2019 | Georgescu et al. |
| 2019/0318226 A1* | 10/2019 | Yang ...................... G06N 3/063 |
| 2022/0155398 A1* | 5/2022 | Norman ............. G01R 33/5602 |

OTHER PUBLICATIONS

Yang et al., "Research on Feature Extraction of Tumor Image Based on Convolutional Neural Network", IEEE Access, 2019, pp. 24204-24213, vol. 7.

Dos Santos et al., "CorneaNet: fast segmentation of cornea OCT scans of healthy and keratoconic eyes using deep learning", Biomedical Optics Express 622, 2019, 20 pages, vol. 10, No. 2.

Ge et al., "Deep Learning and Multi-Sensor Fusion for Glioma Classification Using Multistream 2D Convolutional Networks", IEEE, 2018, pp. 5894-5897.

Guo et al., "Medical Image Segmentation Based on Multi-Modal Convolutional Neural Network: Study on Image Fusion Schemes", IEEE 15th International Symposium on Biomedical Imaging, 2018, pp. 903-907.

Kolluru et al., "Machine learning for segmenting cells in corneal endothelium images", Proc SPIE Int Soc Op Eng, 2019, pp. 1-17.

Yu et al., "Multi-Scale Context Aggregation by Dilated Convolutions", arXiv: 1511.07122v3, 2016, pp. 1-13.

* cited by examiner

DEEP-LEARNING MODELS FOR IMAGE PROCESSING

CROSS-REFERENCE TO RELATED APPLICATIONS

This application is the United States national phase of International Application No. PCT/US2020/037427 filed Jun. 12, 2020, and claims priority to U.S. Provisional Patent Application No. 62/860,392 filed Jun. 12, 2019, the disclosures of which are hereby incorporated by reference in their entirety.

BACKGROUND

1. Field

This disclosure relates generally to deep-learning and, in non-limiting embodiments, deep-learning models for image processing.

2. Technical Considerations

Optical Coherence Tomography (OCT) is an imaging modality used in part to visualize corneal, limbal, and retinal structures with micrometer resolution. OCT can be used to estimate corneal biometric parameters, such as corneal curvature and refractive power, and it has been integrated into surgical microscopes for use in surgical procedures such as cataract surgery, LASIK, and Deep Anterior Lamellar Keratoplasty (DALK). Accurate reconstruction of the cornea and estimation of these parameters for clinical use requires precise delineation of corneal tissue interfaces, thereby aiding surgeons with their surgical planning. Existing image analysis-based corneal interface segmentation approaches do not generalize to volumes acquired from different OCT scanners. Rather, such existing approaches are ad hoc with key parameters being chosen manually.

SUMMARY

According to non-limiting embodiments or aspects, provided is a computer-implemented method for creating a deep-learning model for processing image data, comprising: establishing dense connections between each layer of a plurality of layers of a convolutional neural network (CNN) and a plurality of preceding layers of the CNN; downsampling an input of each downsampling layer of a plurality of downsampling layers in a first branch of the CNN; and upsampling an input of each upsampling layer of a plurality of upsampling layers in a second branch of the CNN by convolving the input.

In non-limiting embodiments or aspects, the method further comprises processing an Optical Coherence Tomography (OCT) corneal image using the CNN. In non-limiting embodiments or aspects, processing the OCT corneal image further comprises segmenting the OCT corneal image into at least three corneal interfaces. In non-limiting embodiments or aspects, the at least three corneal interfaces comprise Epithelium, Bowman's Layer, and Endothelium. In non-limiting embodiments or aspects, the method further comprises segmenting an anterior corneal tissue interface of the OCT corneal image and a posterior corneal tissue interface of the OCT image. In non-limiting embodiments or aspects, the method further comprises processing an ultrasound image using the CNN. In non-limiting embodiments or aspects, the method further comprises training the CNN based on images from a plurality of different OCT scanners. In non-limiting embodiments or aspects, convolving the input comprises calculating a 3×3 pixel convolution or a differently sized convolution of the input. In non-limiting embodiments or aspects, the dense connections are at least six layers deep.

According to non-limiting embodiments or aspects, provided is a system for creating a deep-learning model for processing image data, comprising at least one processor programmed or configured to: establish dense connections between each layer of a plurality of layers of a convolutional neural network (CNN); downsample an input of each downsampling layer of a plurality of downsampling layers in a first branch of the CNN; and upsample an input of each upsampling layer of a plurality of upsampling layers in a second branch of the CNN by convoluting the input.

In non-limiting embodiments or aspects, the at least one processor is further programmed or configured to process an Optical Coherence Tomography (OCT) corneal image using the CNN. In non-limiting embodiments or aspects, the at least one processor is further programmed or configured to segment the OCT corneal image into at least three corneal interfaces. In non-limiting embodiments or aspects, the at least three corneal interfaces comprise Epithelium, Bowman's Layer, and Endothelium. In non-limiting embodiments or aspects, the at least one processor is further programmed or configured to segment an anterior corneal tissue interface of the OCT corneal image and a posterior corneal tissue interface of the OCT image. In non-limiting embodiments or aspects, the at least one processor is further programmed or configured to process an ultrasound image using the CNN. In non-limiting embodiments or aspects, the at least one processor is further programmed or configured to train the CNN based on images from a plurality of different OCT scanners. In non-limiting embodiments or aspects, convoluting the input comprises calculating a 3×3 convolution of the input. In non-limiting embodiments or aspects, the dense connections are a plurality of layers deep. In non-limiting embodiments or aspects, the at least one processor is further programmed or configured to process, using the CNN, an Optical Coherence Tomography (OCT) image of at least one of the following: a limbus, a cornea, or a combination thereof. In non-limiting embodiments or aspects, the at least one processor is further programmed or configured to process, using the CNN, an Optical Coherence Tomography (OCT) image of at least one of the following: a limbus, a cornea, or a combination thereof. In non-limiting embodiments or aspects, the at least one processor is further programmed or configured to process images, using the CNN, from multiple different imaging systems, including at least two of the following: a Scanning Laser Ophthalmoscope (SLO) image, an Optical Coherence Tomography (OCT) image, an ultrasound image, a camera image, a light-field image, any other type of image of any dimension and data type, or any combination thereof. In non-limiting embodiments or aspects, the at least one processor is further programmed or configured to process, using the CNN, images from multiple different imaging systems, including at least two of the following: a Scanning Laser Ophthalmoscope (SLO) image, an Optical Coherence Tomography (OCT) image, an ultrasound image, a camera image, a light-field image, any other type of image of any dimension and data type, or any combination thereof.

According to non-limiting embodiments or aspects, provided is a computer program product for creating a deep-learning model for processing image data, comprising at least one non-transitory computer-readable medium comprising program instructions that, when executed by at least one processor, cause the at least one processor to: establish dense connections between each layer of a plurality of layers of a convolutional neural network (CNN) and a plurality of preceding layers of the CNN; downsample an input of each downsampling layer of a plurality of downsampling layers in a first branch of the CNN; and upsample an input of each upsampling layer of a plurality of upsampling layers in a second branch of the CNN by convoluting the input.

According to non-limiting embodiments or aspects, provided is a method for creating a deep-learning model for processing image data, comprising: establishing dense connections between each layer of a plurality of layers of a convolutional neural network (CNN) and a plurality of preceding layers of the CNN; establishing residual connections within building blocks of each layer of the plurality of layers of the CNN and the plurality of preceding layers of the CNN; downsampling an input of each downsampling layer of a plurality of downsampling layers in a first branch of the CNN; and upsampling an input of each upsampling layer of a plurality of upsampling layers in a second branch of the CNN.

In non-limiting embodiments or aspects, the dense connections are established between nodes in the first branch and between nodes in the second branch. In non-limiting embodiments or aspects, upsampling the input of each upsampling layer comprises convolving the input. In non-limiting embodiments or aspects, downsampling the input of each downsampling layer comprises computing a max pool for the input. In non-limiting embodiments or aspects, upsampling the input of each upsampling layer comprises computing a nearest neighbor interpolation.

According to non-limiting embodiments or aspects, provided is a system for creating a deep-learning model for processing image data, comprising a computing device configured to: establish dense connections between each layer of a plurality of layers of a convolutional neural network (CNN) and a plurality of preceding layers of the CNN; establish residual connections within building blocks of each layer of the plurality of layers of the CNN and the plurality of preceding layers of the CNN; downsample an input of each downsampling layer of a plurality of downsampling layers in a first branch of the CNN; and upsample an input of each upsampling layer of a plurality of upsampling layers in a second branch of the CNN.

In non-limiting embodiments or aspects, the dense connections are established between nodes in the first branch and between nodes in the second branch. In non-limiting embodiments or aspects, upsampling the input of each upsampling layer comprises convolving the input. In non-limiting embodiments or aspects, downsampling the input of each downsampling layer comprises computing a max pool for the input. In non-limiting embodiments or aspects, upsampling the input of each upsampling layer comprises computing a nearest neighbor interpolation. In non-limiting embodiments or aspects, the computing device is further programmed or configured to establish dilated convolutions within building blocks of each layer of a plurality of layers of the CNN and a plurality of preceding layers of the CNN. In non-limiting embodiments or aspects, the computing device is further programmed or configured to establish dilated convolutions within building blocks of each layer of a plurality of layers of the CNN and a plurality of preceding layers of the CNN. In non-limiting embodiments or aspects, further comprising establishing a set of dilated and/or non-dilated convolutions within a block of the CNN based on different dilation strides, the convolutions are based on fixed and/or learnable weights. In non-limiting embodiments or aspects, the computing device is further programmed or configured to establish a set of dilated and/or non-dilated convolutions within a block of the CNN based on different dilation strides, the convolutions are based on fixed and/or learnable weights. In non-limiting embodiments or aspects, further comprising gathering additional spatial context of surrounding image content, the surrounding image content comprises surrounding tissue structure or any other element. In non-limiting embodiments or aspects, the computing device is further programmed or configured to gather additional spatial context of surrounding image content, the surrounding image content comprises surrounding tissue structure or any other element.

According to non-limiting embodiments or aspects, provided is a computer-implemented method for creating a deep-learning model for processing image data, comprising: establishing dense connections between each layer of a plurality of layers in a convolutional neural network (CNN) and a plurality of preceding layers in the CNN; downsampling an input of each downsampling layer of a plurality of downsampling layers in a first branch of the CNN by computing a max pool for the input; and upsampling an input of each upsampling layer of a plurality of upsampling layers in a second branch of the CNN by computing a nearest neighbor interpolation and convoluting the input.

In non-limiting embodiments or aspects, the method further comprises processing an Optical Coherence Tomography (OCT) corneal image using the CNN. In non-limiting embodiments or aspects, the method further comprises segmenting the OCT corneal image into at least three corneal interfaces. In non-limiting embodiments or aspects, the three corneal interfaces comprise Epithelium, Bowman's Layer, and Endothelium. In non-limiting embodiments or aspects, the method further comprises segmenting an anterior corneal tissue interface of the OCT corneal image and a posterior corneal tissue interface of the OCT image. In non-limiting embodiments or aspects, the method further comprises processing an ultrasound image using the CNN. In non-limiting embodiments or aspects, the method further comprises training the CNN based on images from a plurality of different OCT scanners. In non-limiting embodiments or aspects, convoluting the input comprises calculating a 3×3 convolution of the input. In non-limiting embodiments or aspects, the dense connections are at least six layers deep.

According to non-limiting embodiments or aspects, provided is a system for creating a deep-learning model for processing image data, comprising at least one processor programmed or configured to: establish dense connections between each layer of a plurality of layers in a convolutional neural network (CNN) and a plurality of preceding layers in the CNN; downsample an input of each downsampling layer of a plurality of downsampling layers in a first branch of the CNN by computing a max pool for the input; and upsample an input of each upsampling layer of a plurality of upsampling layers in a second branch of the CNN by computing a nearest neighbor interpolation and convolving the input.

In non-limiting embodiments or aspects, the at least one processor is further programmed or configured to process an Optical Coherence Tomography (OCT) corneal image using the CNN. In non-limiting embodiments or aspects, the at least one processor is further programmed or configured to segment the OCT corneal image into at least three corneal interfaces. In non-limiting embodiments or aspects, the three corneal interfaces comprise Epithelium, Bowman's Layer, and Endothelium. In non-limiting embodiments or aspects, the at least one processor is further programmed or configured to segment an anterior corneal tissue interface of the OCT corneal image and a posterior corneal tissue interface of the OCT image. In non-limiting embodiments or aspects, the at least one processor is further programmed or configured to process an ultrasound image using the CNN. In non-limiting embodiments or aspects, the at least one processor is further programmed or configured to train the CNN based on images from a plurality of different OCT scanners. In non-limiting embodiments or aspects, convoluting the input comprises calculating a 3×3 convolution of the input. In non-limiting embodiments or aspects, the dense connections are at least six layers deep.

According to non-limiting embodiments or aspects, provided is a computer program product for creating a deep-learning model for processing image data, comprising at least one non-transitory computer-readable medium comprising program instructions that, when executed by at least one processor, cause the at least one processor to: establish dense connections between each layer of a plurality of layers of a convolutional neural network (CNN) and a plurality of preceding layers of the CNN; downsample an input of each downsampling layer of a plurality of downsampling layers in a first branch of the CNN by computing a max pool for the input; and upsample an input of each upsampling layer of a plurality of upsampling layers in a second branch of the CNN by computing a nearest neighbor interpolation and convoluting the input.

Further non-limiting embodiments or aspects are set forth in the following numbered clauses:

Clause 1: A computer-implemented method for creating a deep-learning model for processing image data, comprising: establishing dense connections between each layer of a plurality of layers of a convolutional neural network (CNN) and a plurality of preceding layers of the CNN; downsampling an input of each downsampling layer of a plurality of downsampling layers in a first branch of the CNN; and upsampling an input of each upsampling layer of a plurality of upsampling layers in a second branch of the CNN by convolving the input.

Clause 2: The computer-implemented method of clause 1, further comprising processing an Optical Coherence Tomography (OCT) corneal image using the CNN.

Clause 3: The computer-implemented method of clauses 1 or 2, wherein processing the OCT corneal image further comprises segmenting the OCT corneal image into at least three corneal interfaces.

Clause 4: The computer-implemented method of any of clauses 1-3, wherein the at least three corneal interfaces comprise Epithelium, Bowman's Layer, and Endothelium.

Clause 5: The computer-implemented method of any of clauses 1-4, further comprising segmenting an anterior corneal tissue interface of the OCT corneal image and a posterior corneal tissue interface of the OCT image.

Clause 6: The computer-implemented method of any of clauses 1-5, further comprising processing an ultrasound image using the CNN.

Clause 7: The computer-implemented method of any of clauses 1-6, further comprising training the CNN based on images from a plurality of different OCT scanners.

Clause 8: The computer-implemented method of any of clauses 1-7, wherein convolving the input comprises calculating a 3×3 pixel convolution or a differently sized convolution of the input.

Clause 9: The computer-implemented method of any of clauses 1-8, wherein the dense connections are at least six layers deep.

Clause 10: The computer-implemented method of any of clauses 1-9, further comprising processing, using the CNN, an Optical Coherence Tomography (OCT) image of at least one of the following: a limbus, a cornea, or a combination thereof.

Clause 11: The computer-implemented method of any of clauses 1-10, further comprising processing, using the CNN, images from multiple different imaging systems, including at least two of the following: a Scanning Laser Ophthalmoscope (SLO) image, an Optical Coherence Tomography (OCT) image, an ultrasound image, a camera image, a light-field image, any other type of image of any dimension and data type, or any combination thereof.

Clause 12: A system for creating a deep-learning model for processing image data, comprising at least one processor programmed or configured to: establish dense connections between each layer of a plurality of layers of a convolutional neural network (CNN); downsample an input of each downsampling layer of a plurality of downsampling layers in a first branch of the CNN; and upsample an input of each upsampling layer of a plurality of upsampling layers in a second branch of the CNN by convoluting the input.

Clause 13: The system of clause 12, wherein the at least one processor is further programmed or configured to process an Optical Coherence Tomography (OCT) corneal image using the CNN.

Clause 14: The system of clauses 12 or 13, wherein the at least one processor is further programmed or configured to segment the OCT corneal image into at least three corneal interfaces.

Clause 15: The system of any of clauses 12-14, wherein the at least three corneal interfaces comprise Epithelium, Bowman's Layer, and Endothelium.

Clause 16: The system of any of clauses 12-15, wherein the at least one processor is further programmed or configured to segment an anterior corneal tissue interface of the OCT corneal image and a posterior corneal tissue interface of the OCT image.

Clause 17: The system of any of clauses 12-16, wherein the at least one processor is further programmed or configured to process an ultrasound image using the CNN.

Clause 18: The system of any of clauses 12-17, wherein the at least one processor is further programmed or configured to train the CNN based on images from a plurality of different OCT scanners.

Clause 19: The system of any of clauses 12-18, wherein convoluting the input comprises calculating a 3×3 convolution of the input.

Clause 20: The system of any of clauses 12-19, wherein the dense connections are a plurality of layers deep.

Clause 21: The system of any of clauses 12-20, wherein the at least one processor is further programmed or configured to process, using the CNN, an Optical Coherence Tomography (OCT) image of at least one of the following: a limbus, a cornea, or a combination thereof.

Clause 22: The system of any of clauses 12-21, wherein the at least one processor is further programmed or configured to process images, using the CNN, from multiple different imaging systems, including at least two of the following: a Scanning Laser Ophthalmoscope (SLO) image, an Optical Coherence Tomography (OCT) image, an ultrasound image, a camera image, a light-field image, any other type of image of any dimension and data type, or any combination thereof.

Clause 23: A computer program product for creating a deep-learning model for processing image data, comprising at least one non-transitory computer-readable medium comprising program instructions that, when executed by at least one processor, cause the at least one processor to: establish dense connections between each layer of a plurality of layers of a convolutional neural network (CNN) and a plurality of preceding layers of the CNN; downsample an input of each downsampling layer of a plurality of downsampling layers in a first branch of the CNN; and upsample an input of each upsampling layer of a plurality of upsampling layers in a second branch of the CNN by convoluting the input.

Clause 24: A computer-implemented method for creating a deep-learning model for processing image data, comprising: establishing dense connections between each layer of a plurality of layers of a convolutional neural network (CNN) and a plurality of preceding layers of the CNN; establishing residual connections within building blocks of each layer of the plurality of layers of the CNN and the plurality of preceding layers of the CNN; downsampling an input of each downsampling layer of a plurality of downsampling layers in a first branch of the CNN; and upsampling an input of each upsampling layer of a plurality of upsampling layers in a second branch of the CNN.

Clause 25: The computer-implemented method of clause 24, wherein the dense connections are established between nodes in the first branch and between nodes in the second branch.

Clause 26: The computer-implemented method of clauses 24 or 25, wherein upsampling the input of each upsampling layer comprises convolving the input.

Clause 27: The computer-implemented method of any of clauses 24-26, wherein downsampling the input of each downsampling layer comprises computing a max pool for the input.

Clause 28: The computer-implemented method of any of clauses 24-27, wherein upsampling the input of each upsampling layer comprises computing a nearest neighbor interpolation.

Clause 29: The computer-implemented method of any of clauses 24-28, further comprising establishing dilated convolutions within building blocks of each layer of a plurality of layers of the CNN and a plurality of preceding layers of the CNN.

Clause 30: The computer-implemented method of any of clauses 24-29, further comprising establishing a set of dilated and/or non-dilated convolutions within a block of the CNN based on different dilation strides, wherein the convolutions are based on fixed and/or learnable weights.

Clause 31: The computer-implemented method of any of clauses 24-30, further comprising gathering additional spatial context of surrounding image content, wherein the surrounding image content comprises surrounding tissue structure or any other element Clause 32: A system for creating a deep-learning model for processing image data, comprising a computing device configured to: establish dense connections between each layer of a plurality of layers of a convolutional neural network (CNN) and a plurality of preceding layers of the CNN; establish residual connections within building blocks of each layer of the plurality of layers of the CNN and the plurality of preceding layers of the CNN; downsample an input of each downsampling layer of a plurality of downsampling layers in a first branch of the CNN; and upsample an input of each upsampling layer of a plurality of upsampling layers in a second branch of the CNN.

Clause 33: The system of clause 32, wherein the dense connections are established between nodes in the first branch and between nodes in the second branch.

Clause 34: The system of clauses 32 or 33, wherein upsampling the input of each upsampling layer comprises convolving the input.

Clause 35: The system of any of clauses 32-34, wherein downsampling the input of each downsampling layer comprises computing a max pool for the input.

Clause 36: The system of any of clauses 32-35, wherein upsampling the input of each upsampling layer comprises computing a nearest neighbor interpolation.

Clause 37: The system of any of clauses 32-36, wherein the computing device is further programmed or configured to establish dilated convolutions within building blocks of each layer of a plurality of layers of the CNN and a plurality of preceding layers of the CNN.

Clause 38: The system of any of clauses 32-37, wherein the computing device is further programmed or configured to establish a set of dilated and/or non-dilated convolutions within a block of the CNN based on different dilation strides, wherein the convolutions are based on fixed and/or learnable weights.

Clause 39: The system of any of clauses 32-38, wherein the computing device is further programmed or configured to gather additional spatial context of surrounding image content, wherein the surrounding image content comprises surrounding tissue structure or any other element.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figure and appendices, in which.

DETAILED DESCRIPTION

It is to be understood that the embodiments may assume various alternative variations and step sequences, except where expressly specified to the contrary. It is also to be understood that the specific devices and processes described in the following specification are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. A computing device may also be a desktop computer or other form of non-mobile computer. In non-limiting embodiments, a computing device may include an AI accelerator, including an application-specific integrated circuit (ASIC) neural engine such as Apple's "Neural Engine" or Google's TensorFlow processing unit. In non-limiting embodiments, a computing device may be comprised of a plurality of individual circuits representing each connection in a neural network, such that each circuit is configured to weigh inputs from each node in a neural network. In such an arrangement, logic gates and/or analog circuitry may be used without needing software, a processor, or memory.

Non-limiting embodiments of this disclosure are directed to a deep-learning network for processing images using one or more computing devices, including a unique and unconventional deep-learning network architecture that provides for numerous technical advantages described herein. Although many of the examples described herein relate to the processing of OCT images, it will be appreciated that the systems and methods described may be used to process any type of input data. As an example, non-limiting embodiments may also be used to process ultrasound images and other medical images. Various non-medical uses are also possible.

Existing systems for segmenting corneal images apply CNNs, such as UNET and BRUNET architectures. These networks include contracting and expanding branches that produce a dense output where each pixel is assigned a classification (e.g., a type of tissue). Although a BRUNET architecture improves the accuracy of a UNET architecture for image classification, such deep-learning networks are not sufficiently accurate for various analyses of corneal OCT images. For example, in anterior segment OCT imaging, the boundaries between segments may be corrupted by speckle noise and have a low signal-to-noise ratio (SNR). Moreover, such approaches result in false positives due in part to discriminative features related to these boundaries being learned in earlier layers but lost through the network such that they cannot be recovered with residual connections.

Non-limiting embodiments provide for a Convolutional Neural Network (CNN) architecture that is used to segment corneal interfaces including (1) Epithelium, (2) Bowman's Layer, and (3) Endothelium. The corneal interfaces may be segmented from OCT images that originate from various different types of OCT scanners and the CNN may likewise be trained using OCT images that originate from different types of OCT scanners.

Figure 1:
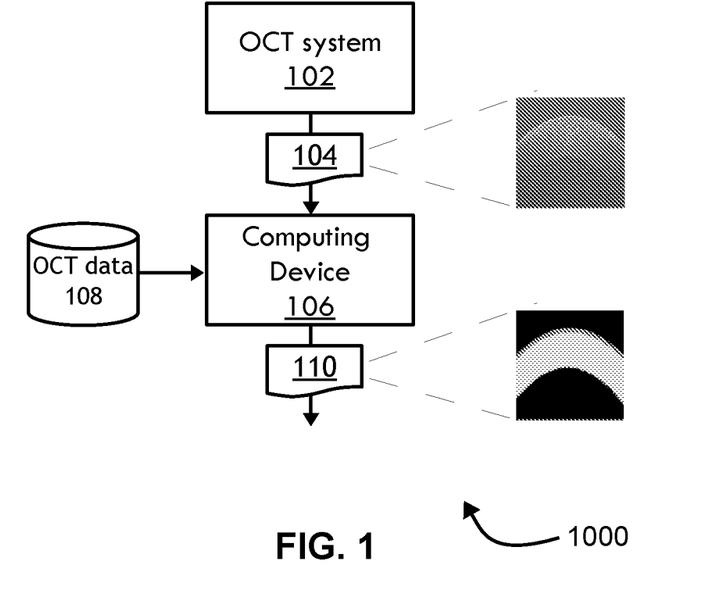
FIG. 1 illustrates a system for processing image data according to non-limiting embodiments.

Referring now to FIG. 1 shown is a system 1000 for creating deep-learning models for processing image data according to non-limiting embodiments. The system 1000 includes an OCT system 102, such as one or more OCT scanners that outputs one or more OCT images 104. A computing device 106 implementing a deep-learning network described herein (e.g., a Corneal Interface Segmentation Network (CorNet system)) receives the OCT image(s) 104 and processes the image(s) to segment the corneal interfaces represented therein. The input OCT image 104 may be split width-wise into a set of slices of dimensions of 256×1024 pixels, as an example, although it will be appreciated that the image 104 may be processed in various ways and dimensions. The computing device 106 implementing the deep-learning network may include one or more computing devices in any location, such that a first computing device may perform one or more steps and a second computing device may perform one or more steps.

With continued reference to FIG. 1, the computing device 106 is in communication with OCT data 108 (e.g., historical image data) from previous OCT scans performed by different OCT systems. The OCT data 108 may be stored on one or more data storage devices in any location and may also include OCT scans from the OCT system 102 in addition to scans obtained by other OCT systems (not shown in FIG. 1). For example, the OCT data 108 may include data sets from OCT scans captured by other OCT scanning systems that have different settings and/or parameters than OCT system 102. The deep-learning network implemented with the computing device 106 is trained to segment corneal interfaces from the OCT data 108. Once trained, the deep-learning network outputs predictions of where different corneal interfaces are located. The computing device 106 may then segment the corneal interfaces by fitting one or more curves to the predicted corneal interface locations in the input OCT image 104 to create an output OCT image 110 that visually distinguishes between the corneal interfaces. For example, the output OCT image 110 may include one or more annotations or modifications, such as lines, highlights, colored regions, and/or the like, to visually display the different corneal interfaces. The output OCT image 110 may additionally or alternatively include labels for each pixel or set of pixels in the input OCT image 104. As an example, the input OCT image 104 may be overlaid with such annotations or may be edited to only display the segmented corneal interfaces.

In some examples, full-size OCT images may present computational inefficiencies when training the network based on image size and due to different resolutions from different OCT scanners. Thus, in some non-limiting embodiments, the input images may be sliced width-wise into a set of images of set dimensions (e.g., 256×1024 pixels) to preserve the OCT resolution. The data may be augmented through horizontal flips, gamma adjustment, Gaussian noise addition, Gaussian blurring, Median blurring, Bilateral blurring, cropping, affine transformations, and/or elastic deformations, as examples.

With continued reference to FIG. 1, in non-limiting embodiments, the deep-learning network implemented with the computing device 106 is configured to segment a given OCT image by classifying each pixel. For a given OCT image, a function $F:I \rightarrow L$ is identified that maps every pixel in/to a label $L \in \{0, 1, 2, 3\}$. In this example, the value "0" represents the background of the image and values "1," "2,"

and "3" are labels associated with the Epithelium interface, Bowman's Layer, and the Endothelium interface. It will be appreciated that various other labels and representations of labels may be used to classify each pixel. Moreover, although each pixel of an image may be classified in some non-limiting embodiments, in other non-limiting embodiments two or more pixels may be classified together.

Figure 2:
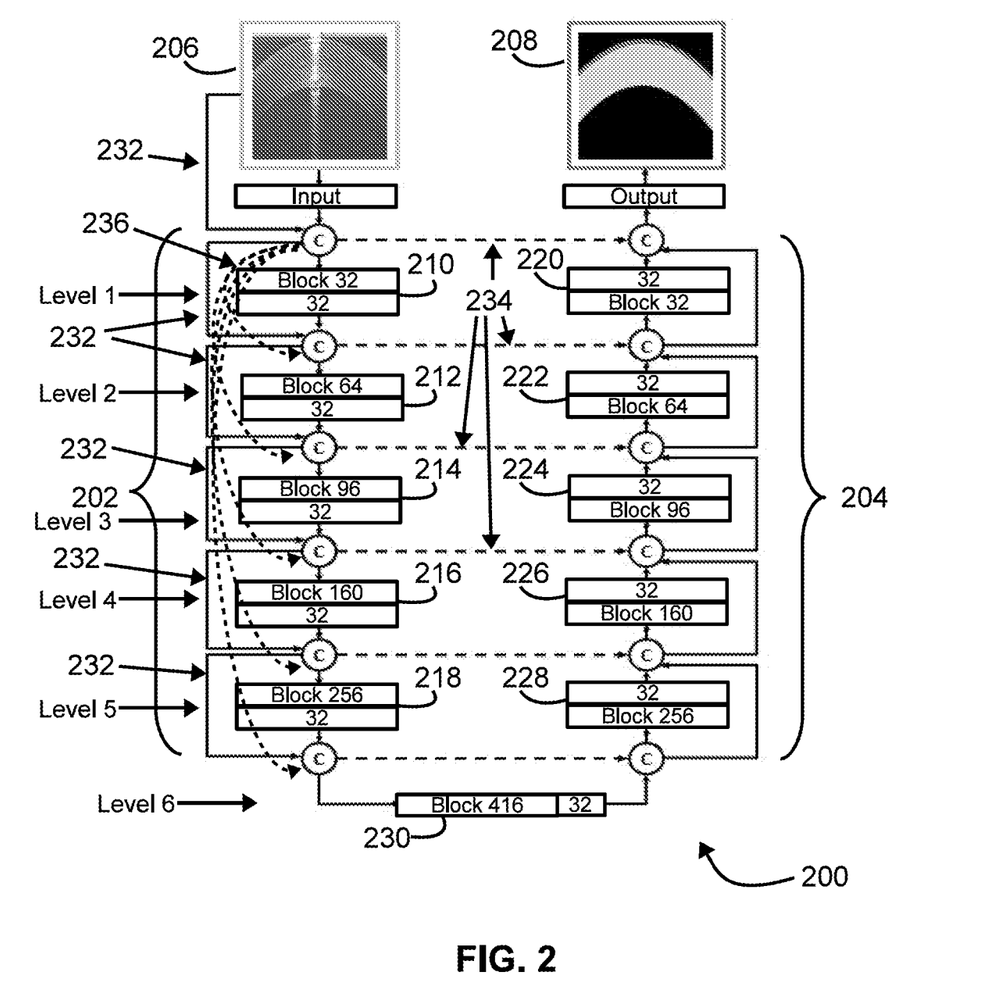
FIG. 2 illustrates a deep-learning network according to non-limiting embodiments.

Referring now to FIG. 2, a deep-learning network 200 (e.g., deep-learning model) is shown according to a non-limiting embodiment. The deep-learning network 200 is enabled to combine both coarse and fine image details through the use of dense connections in both a contracting branch 202 and an expanding branch 204. In such dense connections, each block, layer, or level (e.g., Levels 1-6) is connected to all of its preceding blocks/layers/levels by feature map concatenation (depicted as a circled "C"), thereby allowing discernible features of faint boundaries to be retrieved across multiple scales. In non-limiting embodiments, the number of densely connected layers is limited to achieve computational efficiency. As an example, and as shown in FIG. 2, the deep-learning network 200 may include six (6) layers (e.g., Levels 1-6) of dense connections as a balance between accuracy (e.g., from more layers) and computational efficiency (e.g., from fewer layers). Further, in non-limiting embodiments, the deep-learning network 200 may utilize max pooling techniques to improve maintaining features of interest through the network layers as compared to average pooling and convolutions of stride techniques. In some non-limiting embodiments, the deep-learning network 200 may utilize nearest neighbor interpolation-based upsampling techniques followed by a 3×3 convolution, which provides better results than bilinear interpolation-based upsampling, bilinear interpolation with a 3×3 convolution, unpooling, and fractionally-strided convolutions.

With continued reference to FIG. 2, the deep-learning network 200 includes a contracting branch 202 and an expanding branch 204. The blocks of the contracting branch 202 represent downsampling computations and the blocks of the expanding branch 204 represent upsampling computations. The network predicts an output for each slice of a set of slices of dimensions and the slices are aligned to recreate the original input dimension. In non-limiting embodiments, block 230 does not perform upsampling but functions as a bottleneck of the network and is configured to generate feature maps of the same dimensions as the output feature maps from the previous layer (e.g., block 218 in the contracting branch 202). The values (e.g., 32, 64, 96, 160, 256, 416) associated with each block 210-230 shown in the network 200 represent the number of feature maps output by each block. The difference in the number of feature maps from layer to layer in both branches 202, 204 shows a feature map growth rate that is based on a Fibonacci sequence of values.

Figure 3:
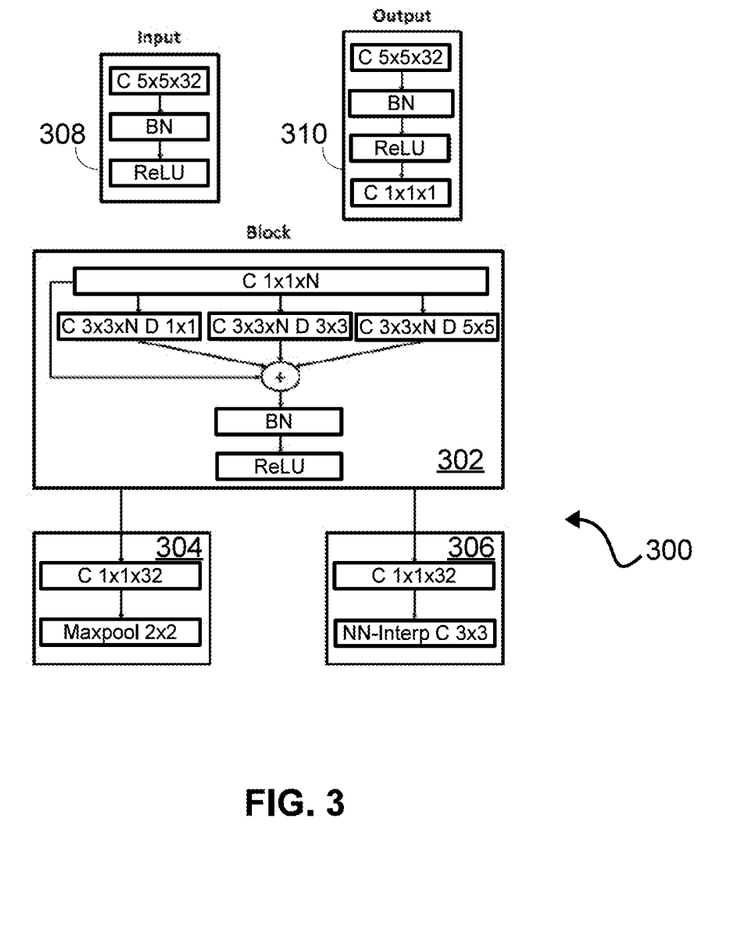
FIG. 3 illustrates a portion of a deep-learning network according to non-limiting embodiments.

Referring to FIG. 3, portions of the deep-learning network 200 shown in FIG. 2 are shown in more detail according to a non-limiting embodiment. In a block 302 of the deep-learning network 200, the value of the block 302 is calculated based on the previous layers as shown. The input 308 and output 310 of the network 200 are shown in FIG. 3 although the block 302 may be several layers removed from the input 308 and/or output 310. "C" refers to a convolution in the deep-learning network 200, "D" refers to a dilated convolution, and the value of "N" is equal to a number of feature maps. "BN" refers to a batch normalization function. A rectified linear activation unit (ReLU) follows the BN as a nonlinear activation function. Dilated convolutions gather contextual information about broader surrounding image content, such as surrounding tissue structure in an OCT image, to accurately segment object or tissue boundaries. As an example, dilated convolutions may "fill in" gaps to perform better than prior methods in regions where the contrast of tissue interface boundaries is poor.

In FIG. 3, the downsampling output 304 of block 302 (e.g., an output of block 302 in the contracting branch of the deep-learning network) is shown with a maxpooling function. The maxpooling function is used to determine the most discriminative features at the end of each downsampling layer. The use of maxpooling optimizes feature selection across the common downsampling choices. An upsampling output 306 of block 302 (e.g., an output of block 302 in the expanding branch of the deep-learning network) is shown with an interpolation function. The interpolation function, which may be a nearest neighbor interpolation, may be used with a convolution (e.g., a 3×3 convolution in this example) to upsample feature maps in the expanding branch of the deep-learning network.

As shown in FIGS. 2 and 3, in non-limiting embodiments, an unconventional neural network architecture is employed for image processing tasks that has advantages of a RES-NET (e.g., a residual neural network) architecture, a UNET architecture, and a Dense-NET architecture. Moreover, in non-limiting embodiments, dilated convolutions are combined with aspects of the aforementioned UNET, RESNET, and Dense-NET architectures.

Referring to the non-limiting examples shown in FIG. 2 and block 302 of FIG. 3, both residual and dense connections are contained within the set of individual solid arrows 232 on the left of FIG. 2 (and a similar set of solid arrows on the right). Residual connections are present in the solid arrows that directly connect the input of a layer or block to its output. Dense connections result from feature concatenation. For example, the concatenated set of solid arrows 232 contains each of the small-dashed curved arrows 236 representing dense connections from the input of block 210 to inputs of each of 212, 214, 216, 218, and 230. Many other dense connections between other pairs of blocks are also present within arrows 232, connecting each block to every other block before it (e.g., a connection from block 212 to each of blocks 214, 216, 218, a connection from block 214 to each of blocks 216 and 218, a connection from block 228 to each of blocks 226, 224, 222, 220, a connection from block 226 to each of blocks 224, 222, 220, a connection from block 224 to each of blocks 222 and 220, etc., none of which are shown in FIG. 2 for clarity). With reference to FIG. 2, the deep-learning network 200 also includes U-Net feature-forwarding connections 234 (shown as dashed straight lines with arrows) between blocks of the same layer in the downsampling branch 202 and upsampling branch 204. The use of feature concatenation also allows dense-type connections to be propagated through the feature-forwarding connections 234.

The residual components of connections allow a layer among a plurality of other layers in the unconventional neural network to learn the appearance of the tissue interlace boundary, and (similarly to RESNET) encourage successive layers to distinguish appearances that have been visualized before and learn new tissue interface appearance information. Moreover, dense components of connections encourage the reuse of feature maps that have been computed previously in the unconventional neural network 200 to enable the network 200 to analyze the shape of the tissue interface boundaries. Similarly to Dense-NET, the dense connections improve gradient information flow and prevent or limit over-fitting. Dense connections differ from residual connections in that residual connections sum the feature maps acquired from the various convolutional operations (dilated or non-dilated) within a layer and the preceding layer. Dense connections, however, promote the concatenation of feature maps from multiple previous layers to a current layer and flow through and/or across several blocks in the network unmodified. For example, in non-limiting embodiments, dense connections may be established through both the downsampling and upsampling branches of the deep-learning network 200.

Combining residual connections and dense connections into a UNET deep-learning architecture results in numerous parameters to be optimized (e.g., a parameter explosion), which increases the demand for computational resources. Non-limiting embodiments of the deep-learning network 200 mitigate this concern by limiting the number of channels and connections in the network 200 and adding bottlenecks (e.g., such as block 230).

Non-limiting embodiments may be combined with pre-segmentation based on a Generational Adversarial Network (GAN) trained using image data.

Figure 4:
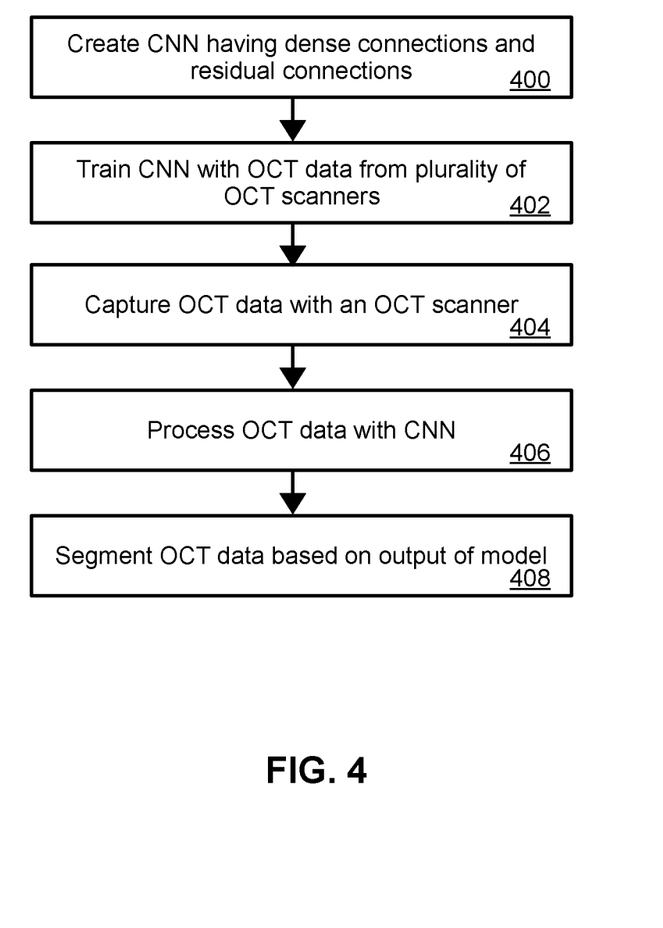
FIG. 4 is a flow diagram of a method for processing mage data according to non-limiting embodiments.

Referring now to FIG. 4, shown is a method for processing image data according to non-limiting embodiments. It will be appreciated that the order of the steps shown in FIG. 4 is for illustration purposes only and that non-limiting embodiments may involve more steps, fewer steps, different steps, and/or a different order of steps. Moreover, the example shown in FIG. 4 relates to OCT data but, as explained herein, the systems and methods disclosed herein may be used in many other contexts. At step 400, a CNN is created having dense connections and residual connections. At step 402, the CNN is trained with OCT data from a plurality of different OCT scanners. The different OCT scanners may employ different settings and/or parameters and, as a result, provide a variety of different data that is beneficial for training. At step 404, OCT data, such as one or more OCT images, is captured with an OCT scanner. The OCT scanner may or may not be one of the OCT scanners used to train the CNN at step 402. At step 406, the OCT data is input into the CNN, which performs downsampling and upsampling on the input through a series of convolutions. At step 408, the OCT data is segmented based on the output of the CNN. For example, the CNN may output an image where each pixel is labeled. The labeling may be, in some examples, different corneal interfaces.

Figure 5:
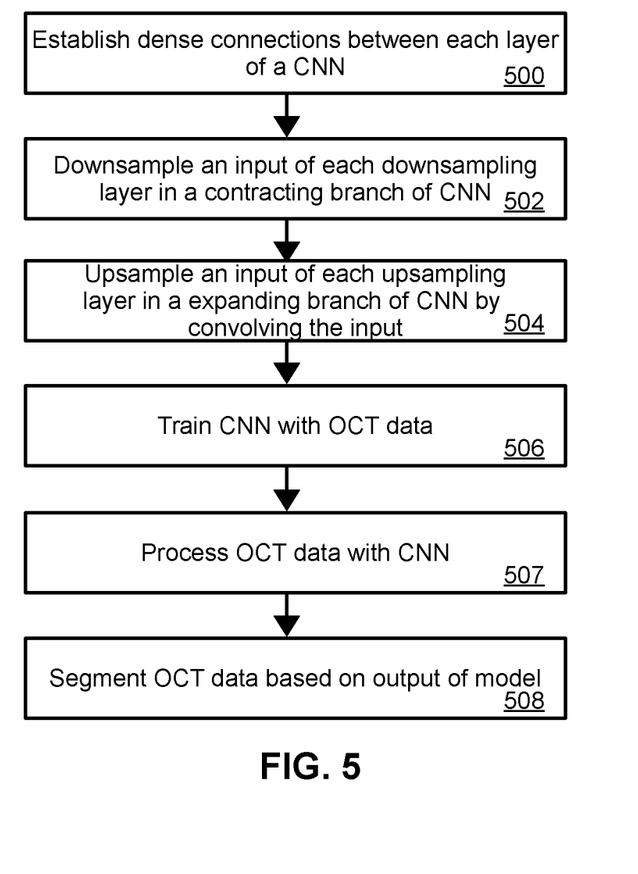
FIG. 5 is a flow diagram of a method for creating a deep-learning model for processing image data according to non-limiting embodiments.

Referring now to FIG. 5, shown is a method for creating a deep-learning model for processing image data according to non-limiting embodiments. It will be appreciated that the order of the steps shown in FIG. 5 is for illustration purposes only and that non-limiting embodiments may involve more steps, fewer steps, different steps, and/or a different order of steps. Moreover, the example shown in FIG. 5 relates to OCT data but, as explained herein, the systems and methods disclosed herein may be used in many other contexts. At step 500, dense connections are established between each layer of a CNN. For example, each layer of the CNN may have a dense connection to each layer that precedes that layer. At step 502, an input of each downsampling layer is downsampled in a first branch (e.g., a contracting branch) of the CNN. At step 504, an input of each upsampling layer is upsampled in a second branch (e.g., an expanding branch) of the CNN by convolving the input. At step 506, once the CNN is created, it is trained with OCT data 506. At step 507, OCT data to be analyzed is input into the CNN. At step 508, the OCT data is segmented based on the output of the CNN.

Figure 6A:
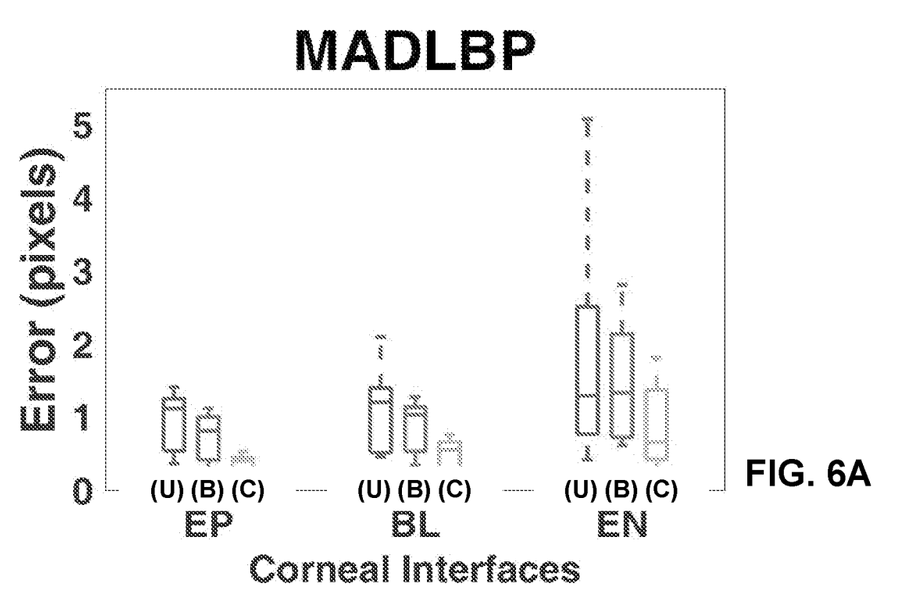
FIGS. 6A-B show test data comparing the results of an implementation according to non-limiting embodiments and other deep-learning architectures.
Figure 6B:
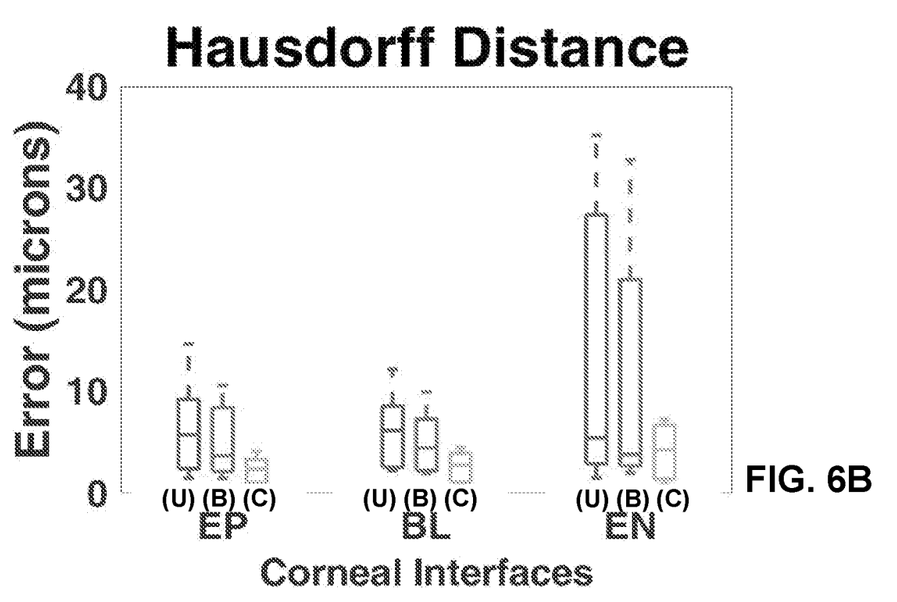

FIGS. 6A and 6B show testing data from one non-limiting implementation of the systems and methods described herein. In each figure, (U) represents metrics from segmentation performed with a UNET architecture, (B) represents metrics from segmentation performed with a BRUNET architecture, and (C) represents metrics from segmentation performed with a deep-learning architecture according to a non-limiting implementation of the deep-learning network described herein. Metrics are shown for three difference corneal interfaces: Epithelium (EP), Bowman's Layer (BL), and Endothelium (EN).

FIG. 6A shows metrics for a Mean Absolute Difference in Layer Boundary Position (MADLBP), and FIG. 6B shows metrics for the Hausdorff Distance (HD) between the fitted curves. According to the test data, for each metric the positive differences of the systems and methods described herein were statistically significant ($p<0.05$). Non-limiting embodiments of the deep-learning network described herein outperform other approaches.

Figure 7:
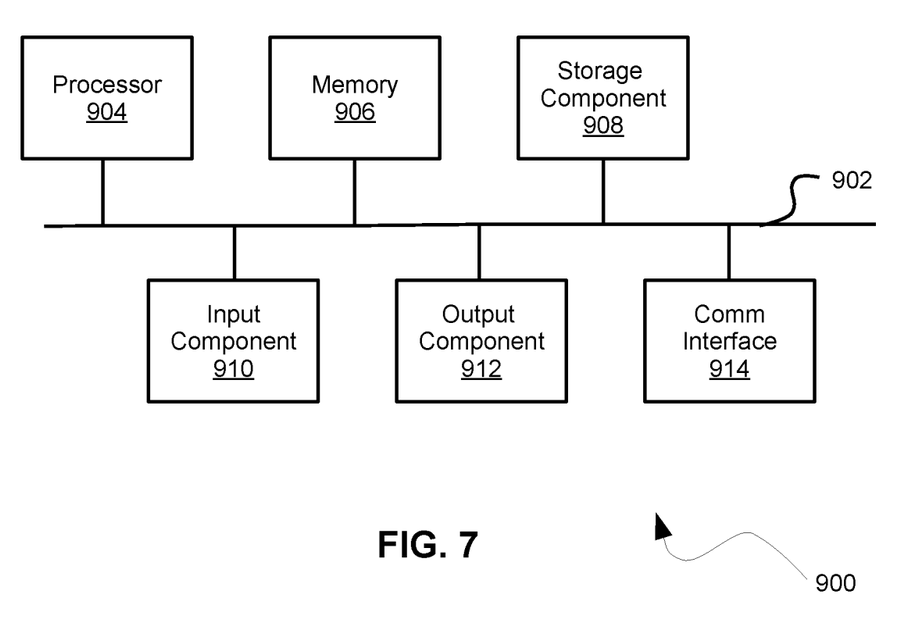
FIG. 7 illustrates example components of a computing device used in connection with non-limiting embodiments.

Referring now to FIG. 7, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 7. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed or configured to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 7, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry (digital and/or analog), or any combination thereof on one or more devices.

In some non-limiting embodiments discussed herein, the computer-implemented method includes processing one or more images and/or a stream of images using the CNN. In some non-limiting embodiments, the computer-implemented method may include processing in real- or substantially-real-time. In some non-limiting embodiments, the image and/or image(s) come from one or more of Optical Coherence Tomography (OCT), ultrasound, opto-acoustic imaging, acousto-optical imaging, magnetic resonance imaging (MRI), computed tomography (CT), positron emission tomography (PET), single-photon emission computerized tomography (SPECT), X-Ray, fluoroscope, Scanning Laser Ophthalmoscope (SLO), camera, light-field imaging, or any other type of image of any dimension, any data type, measuring any physical and/or simulated property(s), or any combination of such images.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for creating a deep-learning model for processing image data, comprising:
    establishing dense connections between each layer of a plurality of layers of a convolutional neural network (CNN) and a plurality of preceding layers of the CNN;
    downsampling an input of each downsampling layer of a plurality of downsampling layers in a first branch of the CNN; and
    upsampling an input of each upsampling layer of a plurality of upsampling layers in a second branch of the CNN by convolving the input.

2. The computer-implemented method of claim 1, further comprising processing an Optical Coherence Tomography (OCT) corneal image using the CNN.

3. The computer-implemented method of claim 2, wherein processing the OCT corneal image further comprises segmenting the OCT corneal image into at least three corneal interfaces.

4. The computer-implemented method of claim 3, wherein the at least three corneal interfaces comprise Epithelium, Bowman's Layer, and Endothelium.

5. The computer-implemented method of claim 2, further comprising segmenting an anterior corneal tissue interface of the OCT corneal image and a posterior corneal tissue interface of the OCT image.

6. The computer-implemented method of claim 1, further comprising processing an ultrasound image using the CNN.

7. The computer-implemented method of claim 2, further comprising training the CNN based on images from a plurality of different OCT scanners.

8. The computer-implemented method of claim 1, wherein convolving the input comprises calculating a 3×3 pixel convolution or a differently sized convolution of the input.

9. The computer-implemented method of claim 1, wherein the dense connections are at least six layers deep.

10. The computer-implemented method of claim 1, further comprising processing, using the CNN, an Optical Coherence Tomography (OCT) image of at least one of the following: a limbus, a cornea, or a combination thereof.

11. The computer-implemented method of claim 1, further comprising processing, using the CNN, images from multiple different imaging systems, including at least two of the following: a Scanning Laser Ophthalmoscope (SLO) image, an Optical Coherence Tomography (OCT) image, an ultrasound image, a camera image, a light-field image, any other type of image of any dimension and data type, or any combination thereof.

12. A system for creating a deep-learning model for processing image data, comprising at least one processor programmed or configured to:
    establish dense connections between each layer of a plurality of layers of a convolutional neural network (CNN);
    downsample an input of each downsampling layer of a plurality of downsampling layers in a first branch of the CNN; and
    upsample an input of each upsampling layer of a plurality of upsampling layers in a second branch of the CNN by convoluting the input.

13. The system of claim 12, wherein the at least one processor is further programmed or configured to process an Optical Coherence Tomography (OCT) corneal image using the CNN.

14. The system of claim 13, wherein the at least one processor is further programmed or configured to segment the OCT corneal image into at least three corneal interfaces.

15. The system of claim 14, wherein the at least three corneal interfaces comprise Epithelium, Bowman's Layer, and Endothelium.

16. The system of claim 13, wherein the at least one processor is further programmed or configured to segment an anterior corneal tissue interface of the OCT corneal image and a posterior corneal tissue interface of the OCT image.

17. The system of claim 12, wherein the at least one processor is further programmed or configured to process an ultrasound image using the CNN.

18. The system of claim 13, wherein the at least one processor is further programmed or configured to train the CNN based on images from a plurality of different OCT scanners.

19. The system of claim 12, wherein convoluting the input comprises calculating a 3×3 convolution of the input.

20. A computer program product for creating a deep-learning model for processing image data, comprising at least one non-transitory computer-readable medium comprising program instructions that, when executed by at least one processor, cause the at least one processor to:
- establish dense connections between each layer of a plurality of layers of a convolutional neural network (CNN) and a plurality of preceding layers of the CNN;
- downsample an input of each downsampling layer of a plurality of downsampling layers in a first branch of the CNN; and
- upsample an input of each upsampling layer of a plurality of upsampling layers in a second branch of the CNN by convoluting the input.

* * * * *